United States Patent [19]

Wada et al.

[11] Patent Number: 5,052,756
[45] Date of Patent: Oct. 1, 1991

[54] PROCESS FOR SEPARATION OF ASBESTOS-CONTAINING MATERIAL AND PREVENTION OF FLOATING OF DUST

[75] Inventors: Eiji Wada, Kanagawa; Nobuo Nakano, Koto, both of Japan

[73] Assignees: Taisei Corporation; JSE Corporation, both of Tokyo, Japan

[21] Appl. No.: 501,346

[22] Filed: Mar. 26, 1990

Related U.S. Application Data

[63] Continuation of Ser. No. 319,280, Mar. 6, 1989, abandoned.

[30] Foreign Application Priority Data

Mar. 4, 1988 [JP] Japan .................................. 63-50692

[51] Int. Cl.$^5$ .......................... B08B 3/02; F21C 37/14
[52] U.S. Cl. .......................................... 299/17; 83/53; 134/22.12; 134/34
[58] Field of Search ............................... 134/21, 22.12

[56] References Cited

U.S. PATENT DOCUMENTS

| | | | |
|---|---|---|---|
| 4,193,635 | 3/1980 | Thiruvengadam et al. | 299/17 |
| 4,274,676 | 6/1981 | Chapel | 299/64 |
| 4,626,291 | 12/1986 | Natale | 134/21 |
| 4,693,755 | 9/1987 | Erzinger | 134/6 X |
| 4,774,974 | 10/1988 | Teter | 134/22.12 |
| 4,806,172 | 2/1989 | Adaci et al. | 134/34 |
| 4,854,393 | 8/1984 | Palet | 173/62 |
| 4,897,121 | 1/1990 | Sasaki | 134/22.18 |

Primary Examiner—David J. Bagnell
Attorney, Agent, or Firm—Lowe, Price, LeBlanc and Becker

[57] ABSTRACT

A process is provided for separation of an asbestos-containing material from a surface to which the asbestos-containing material is adhered, while preventing floating of dust of the removed asbestos-containing material, the process requiring jetting of pressurized water from a plurality of nozzles to the surface at a pressure of at least 80 kg/cm$^2$ so as to wet and remove the asbestos-containing material therefrom by the energy possessed by the pressurized water.

13 Claims, 4 Drawing Sheets

PROCESS FOR SEPARATION OF ASBESTOS-CONTAINING MATERIAL AND PREVENTION OF FLOATING OF DUST

This application is a continuation of application Ser. No. 07/319,280 filed Mar. 6, 1989 (now abandoned).

BACKGROUND OF THE INVENTION (1) Field of the Invention

This invention relates to a process for separation, or stripping, of an asbestos-containing material such as asbestos sprayed to the surface of a ceiling or wall of a building, etc. from the surface and for prevention of floating of dust of the asbestos-containing material in the air.

(2) Description of the Prior Art

Application of asbestos by spraying or coating had been practiced, because of the excellent incombustible and refractory properties, heat-insulating properties and sound-absorbing qualities of the sprayed asbestos, until around 1974. It was found, however, that the sprayed asbestos produces working atmosphere problems, and the application of the sprayed asbestos has not been made since then.

It has recently been pointed out that when the surface spray coated with asbestos is vibrated or an object collides against the asbestos-coated surface or when the binder used in the coating is deteriorated with time, asbestos fibers may fly off or be suspended in air to do harm to the health of human bodies. It is thus urgently required to remove the sprayed asbestos.

Hitherto, the removal of the sprayed asbestos has been made by a method wherein workers wearing dust respirators and dustproof clothes strip the sprayed asbestos layer by rod-type scrapers or wire brushes in a sealed wookroom made for the removal operation.

On the other hand, there have also been used other methods than the removal of asbestos, namely, a method in which the surface of the asbestos coating is solidified by use of a resin or a liquid chemical, and a method in which the asbestos-coated surface is enclosed with boards or the like.

The latter two methods are merely temporary measures but not drastic permanent solutions.

The first-mentioned method comprising physical removal of asbestos is, on the other hand, effective as a permanent solution. However, the manual removal of asbestos by use of rod-type scrapers or wire brushes requires much labor and leads to high working expenses. In addition, this method has the problem that the asbestos fibers generated in the removal operation are suspended in air for a long time, and the sealed workroom must be left sealed for a long time. Forced removal of the suspended asbestos fibers requires the use of HEPA filters and a large-capacity dust collector, leading to extremely high working expenses. Besides, the manual removal of asbestos by the workers has the problem that many portions of asbestos tend to be left unstripped, particularly at narrow areas near corners or the existing piping, and the portions of asbestos left unstripped may scale off later. Furthermore, even with the dust collector used, a small amount of the asbestos fibers separated from the original surface may remain in air or accumulate at the corners of the floor, the asbestos fibers being very difficult to collect.

SUMMARY OF THE INVENTION

Accordingly, it is a primary object of this invention to provide a process which makes it possible to separate, or strip, an asbestos-containing material easily and extremely efficiently, ensure rapid falling of the separated and suspended asbestos fibers to the floor with suppression of flying-off, or dusting, or floating of the asbestos fibers, and speedily make clean air in the sealed workroom formed for the asbestos removal operation.

This invention, for attaining the abovementioned object, provides a process for separation of an asbestos-containing material from a surface to which the asbestos-containing material is adhered and for prevention of floating of dust of the asbestos-containing material, comprising jetting pressurized water from a plurality of nozzles of a rotating nozzle head to the surface at as overlapping streams at a pressure of at least 80 kg/cm$^2$ so as to remove the asbestos-containing material by the energy possessed by the pressurized water.

A further effect on the prevention of the floating of dust of the asbestos-containing material is obtained by preliminarily wetting the surface to which the asbestos-containing material is adhered.

Furthermore, according to this invention, there is also provided a process for separation of an asbestos-containing material from a surface to which the asbestos-containing material is adhered and for prevention of floating of dust of the asbestos-containing material, comprising jetting pressurized water from a plurality of nozzles to the surface at a pressure of at least 80 kg/cm$^2$ to wet and separate the asbestos-containing material, with a polymeric water absorbent scattered on a floor surface facing on the surface to which the asbestos-containing material is adhered, so as to remove the asbestos-containing material by the energy possessed by the pressurized water, and collecting and disposing of the asbestos-containing material and water fallen to the floor surface together with the polymeric absorbent.

In both of the above-mentioned processes, it is preferable to jet the pressurized water substantially in a mist form to the surface from which the asbestos-containing material is to be separated, thereby causing the asbestos containing material to adhere to the particles of the mist and fall to the floor surface together with the particles of the mist.

Thus, according to this invention, the asbestos-containing material is separated, or stripped, from the surface to which the material is adhering, by the energy of pressurized water at a pressure of at least 80 kg/cm$^2$. This process is therefore more efficient, as compared with the conventional manual work using tools such as rod-type scrapers. It may be contemplated to jet the pressurized water from a single nozzle. In that case, however, the layer of the asbestos coating is removed through cutting of the layer, so that a large lump of the coating falls to the floor, causing severe re-floating, of the asbestos fibers. The use of a plurality of nozzles, on the other hand, ensures sequential stripping of small portions of the layer of the asbestos coating, resulting in less re-floating of dust accompanying the falling of the stripped portions of the layer. In addition, the use of a plurality of nozzles enables separation of the asbestos coating at a multiplicity of points, whereby separation efficiency is further enhanced.

In another aspect, this invention is characterized by the separation of the asbestos-containing material by use of water. Therefore, the asbestos fibers fall to the floor while being wetted with water. As a result, the re-floating, of the asbestos fiber upon the falling thereof is substantially prevented. Further, the jetting of pressurized water from the plurality of nozzles ensures that the separation of the asbestos-containing material is effected by the action of the sum total of hydraulic energy supplied from each nozzle on the object surface. Therefore, the quantity of water required per nozzle is small, and it is possible to cause the pressurized water jetted from each nozzle to collide against the surface in a mist form. As a result, the object surface is constantly wetted uniformly while the separation of the asbestos-containing material is carried out, whereby the above-mentioned effect is developed. Even though portions of the asbestos fibers fly off in the mist, the particles of the mist soon falls so the floor, so that the interior of the workroom is soon made clean, and the asbestos fibers fallen to the floor together with water are caught by the water-asbestos slurry already in a wet state, without re-floating. The slurry accumulating on the floor during or after the separating operation is in the wet state when collected for removal by an appropriate cleaner or shovels or scoops, and the collecting and removing operation is extremely easy to perform without any floating or scattering of the matter to be collected.

Moreover, when a polymeric water absorbent is preliminarily sprinkled in a powdery form directly over the floor surface or on the surface of a nonwoven fabric, the absorbent absorbs the jetted pressurized water, so that the slurry scattered on the floor becomes dry and crumbling or free-flowing. Therefore, it is very easy to collect the slurry for removal.

On the other hand, when the object surface is preliminarily wetted with a liquid, for instance, water, the flying-off of fine asbestos fibers upon jetting of the pressurized water is restrained more securely.

The above and other objects, features and advantages of this invention will become apparent from the following description and appended claims, taken in conjunction with the accompanying drawings which show by way of example some preferred embodiments of the invention.

DESCRIPTION OF PREFERRED EMBODIMENTS

Figure 1:
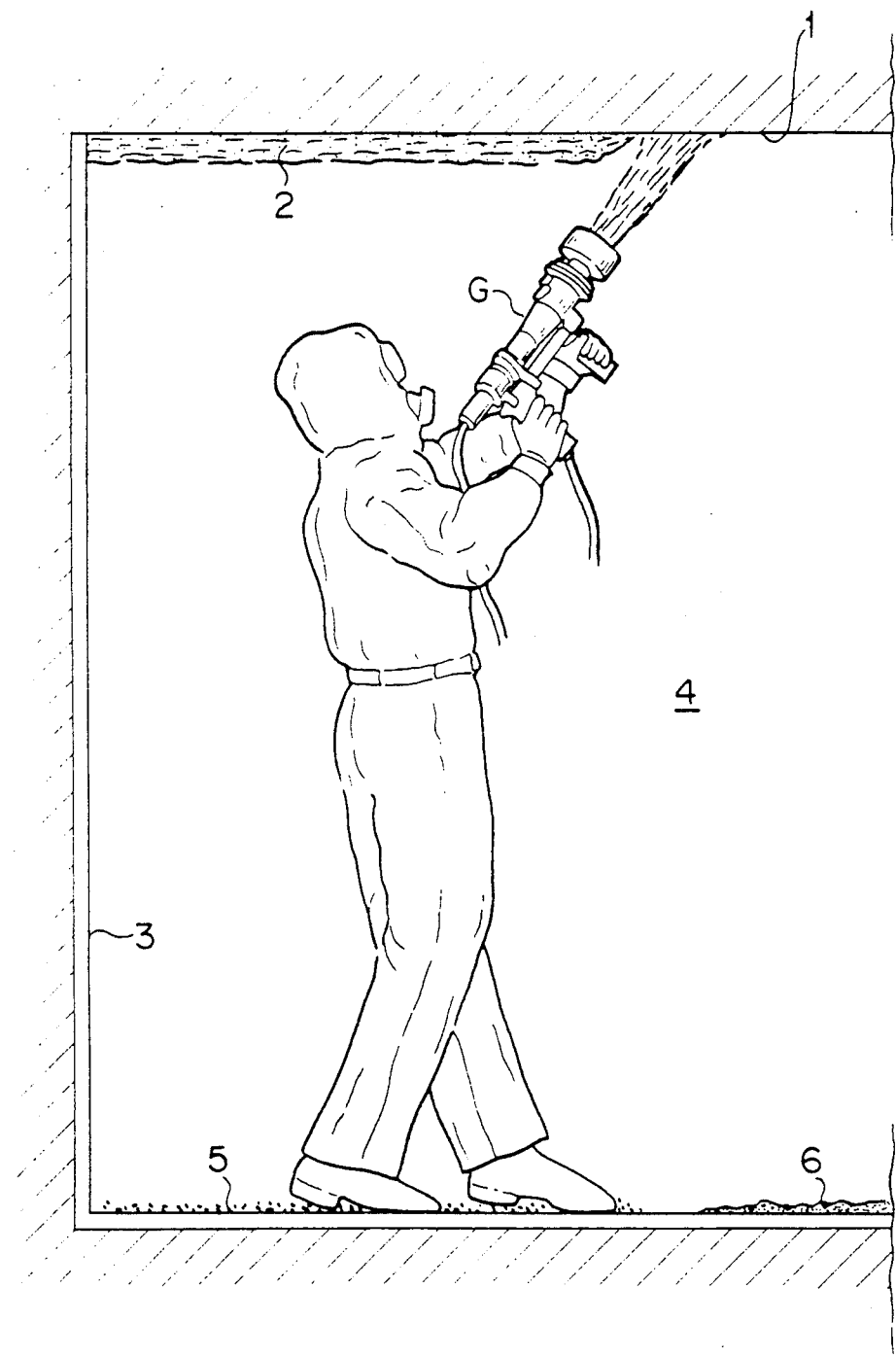
FIG. 1 is a schematic illustration of the execution of the process according to this invention.

This invention will now be described more in detail below.

According to this invention, an asbestos-containing material is separated, or stripped, from the substrate surface to which the material is adhered. Referring to sprayed asbestos, for instance, the asbestos-containing material is a mixture of asbestos, such as crysotile, amosite, crocidolite (blue asbestos), etc., with a binder such as Portland cement, whereas the substrate surface is a surface of veneer plywood. concrete (mortar), metallic plate or the like.

For carrying out the invention, a stripping machine (stripping gun) having a plurality of nozzles for jetting pressurized water is prepared. Pressurized water is led from a water tank to the nozzle head of the stripping machine by a high-pressure pump, and is jetted from each nozzle to the object surface. The pressure of the pressurized water is at least 80 kg/cm$^2$, preferably at least 500 kg/cm$^2$, more preferably at least 800 kg/cm$^2$. The number of the nozzles may be any number greater than one, but a greater number is generally more preferable, from the viewpoint of working efficiency. A nozzle head with at least four nozzle apertures, ordinarily at least seven nozzle apertures, is most suitable from this point of view.

The nozzle head may be non-rotatably fixed to the stripping machine, or may be simply rotated on an axis of rotation in the stripping machine. For avoiding of scratching the substrate surface, for stripping the adhered material in a laminar form to enhance efficiency and for preventing the needless flying-off, or dusting, or floating of the asbestos fibers, however, it is more desirable that the nozzle head is revolved round the axis of rotation while rotating on its own axis. The most suitable type of stripping machine such as this will be described later.

The operation of removing the asbestos-containing material from the substrate surface is preferably carried out after the following preparations. Namely, a sealed workroom is preliminarily formed by enclosing the object surface of separation with a sheet of polyvinyl chloride or the like so as to prevent the flying-off of the asbestos fibers, and the operation is carried out in the sealed workroom. Naturally, the sheet is laid also over the floor surface.

Next, the object surface is preliminarily wetted with a liquid, preferably, water. It was found by the present inventors that the use of about 1 l/m$^2$ of liquid for wetting is sufficient for producing the intended pretreatment effect on the prevention of the flying-off of asbestos, though the value depends on the thickness of the layer of the sprayed asbestos-containing material. In this case, sprinkling of water can be performed by spraying water from a spray gun or from the stripping machine, described later, by spacing the stripping machine apart from the object surface. After water sprinkling, a period of time of about 4 to 5 seconds is taken, before starting the next operation. Other liquid than water may be used for wetting. It may be contemplated, as another means of prevention of the flying-off of fine asbestos fibers, to consolidate preliminarily the object surface by use of a resin or the like, but this approach is inadvantageous because of the high material cost.

After the preparatory treatments, the stripping operation is started. The total quantity of the pressurized water jetted depends on the pressure of water and the number of nozzles. Where the water pressure is at least 700 kg/cm$^2$, the nozzle diameter is 0.05 to 0.5 mm and the number of nozzles is at least 5, a total water quantity of 3 to 12 l/min is suitable. If the water quantity is less than 3 l/min, energy for stripping is not sufficient, whereas if the water quantity is more than 12 l/min, the reaction exerted on the operator holding the stripping machine is so great that the operator cannot endure the reaction. A water quantity of more than 12 l/min can, naturally, be adopted when the stripping machine is electricaly or mechanically driven along a movable base. Under these conditions, the pressurized water is ejected in a mist form from each nozzle, to produce the above-mentioned effect. The stripping operation is carried out with the nozzle head at a distance of about 3 to 50 cm from the object surface.

It is desirable, on the other hand, that the floor surface is preliminarily scattered with a polymeric absorbent conventionally used in paper diapers and the like, for instance, starch, acrylic or polyvinyl alcohol based absorbents, which are known. The polymeric absorbent is generally available in a powdery form. Scattering of the polymeric absorbent powder may be carried out by simply sprinkling the powder to the floor or, if desired, by adhering the powder to a carrier base, for instance, a nonwoven fabric and spreading the thus obtained sheet over the floor. The amount of the polymeric absorbent scattered is preferably 30 g to 1 kg per $m^2$ of the floor surface.

When the separating or stripping operation is conducted in the presence of the polymeric absorbent, jetted water falls directly to the floor surface, or the mist formed slowly falls to the floor surface, whereupon the falling water and asbestos falling together with the watering are prevented from forming a slurry matter but are converted into dry and crumbling deposits by the action of the polymeric absorbent. The deposits are scooped at a suitable time by shovels or scoops, put into a container such as a plastic bag or a sealed metallic container, which is fed out of the sealed workroom. The deposits thus removed from the workroom are then stirred and mixed with Portland cement, sand or the like in the exterior, for solidification. The solidifying operation may be carried out in the sealed workroom. After the solidification, the solidified waste is burried underground, deeper than 2 m below the ground.

Throughout the above-mentioned operations, the worker wears a dust respirator and dustproof clothing. The absorption of water by the polymeric absorbent as mentioned above makes it easy for the workers wearing the dustproof clothing (foot covers, also) to walk in the workroom, unlike in the case of the slurry being formed on the floor.

An embodiment of the operation is shown in FIG. 1. In the embodiment shown, sprayed asbestos 2 is adhered to the ceiling substrate 1, and the operation is carried out in a sealed workroom 4 formed by laying a polyvinyl chloride sheet 3 on the walls and the floor, exclusive of the ceiling surface. Also shown are a pressurized water jetting gun G, a scattered polymeric absorbent 5, and fallen matter 6.

Figure 2:
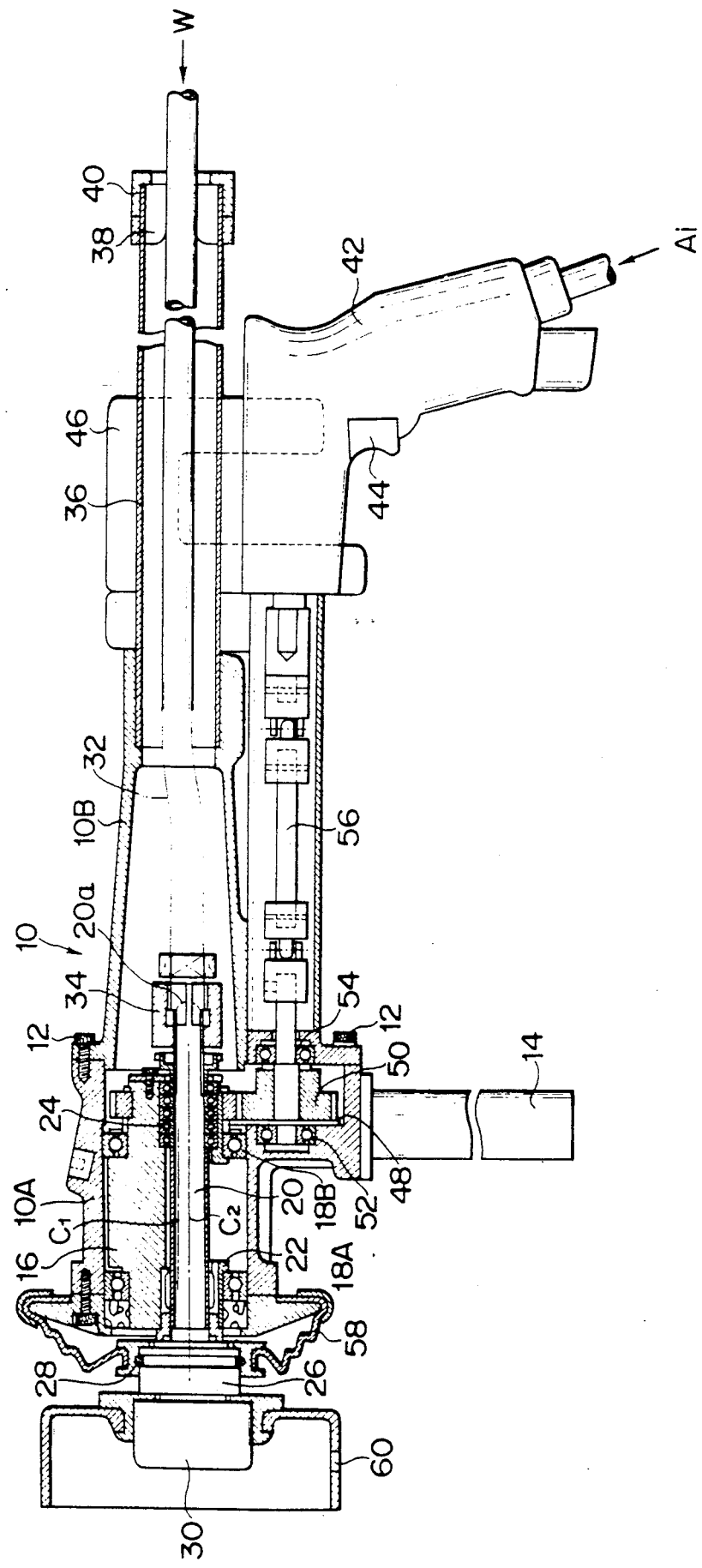
FIG. 2 is a vertical sectional view of a pressurized water jetting device.

A preferred example of the pressurized water jetting gun is shown in FIG. 2 and the latter figures.

A holder 10 of the stripping gun G is of substantially circular tubular form. The holder 10 has a front portion 10A and a rear portion 10B connected to each other by bolts 12 so that the holder can be split into the front and rear portions at the time of repair. A handle 14 is provided on the lower side of the front portion 10A, in a body with the portion 10A. In the front portion 10A, a revolving driven gear 16 is disposed so that as to be rotatable around an axis through the functions of bearings 18A, 18B. A liquid feed pipe 20 is supported on the driven gear 16 through bearings 22, 24, with the axis $C_2$ of the pipe 20 deviated from the axis $C_1$ of the holder 10 by, for example, 5 mm. An attachment 26 is fitted integrally to a front portion of the liquid feed pipe 20 through a thrust bearing 28. A nozzle head 30, which will be described in detail below, is fitted integrally to the attachment 26, coaxially with the axis $C_2$.

On the other hand, the rear end of the liquid feed pipe 20 is connected to a flexible shaft 32, which is connected to an external pump (not shown) for pressurized water W through a spherical seat 20a. Numeral 34 denotes a joint retainer. A rear portion of the flexible shaft 32 is fixed by a bush 38 and a fixing nut 40 to a protective pipe 36, which is fitted to the rear portion 10B of the holder 10.

Numeral 42 denotes an air motor with air Ai as a drive source. The air motor 42 is held by the right hand, whereas the handle 14 is held by the left hand, to support the entire body of the machine. The air motor 42 has a switch 44, and is mounted on the protective pipe 36 by a mount bracket 46. On the other hand, a cavity 48 is formed between the front portion 10A and the rear portion 10B of the holder 10. In the cavity 48 is disposed a driving gear 50, which is rotatably supported by bearings 52, 54. An output shaft of the air motor 42 and the driving gear 50 are connected to each other by a connecting rod 56, and the driving gear 50 is engaged with the driven gears 16.

The front portion of the holder 10 is covered by a flexible cover 58 made of rubber or the like, for protection from spattered asbestos fibers, and the nozzle head 30 is also protected by a cover 60.

Figure 6:
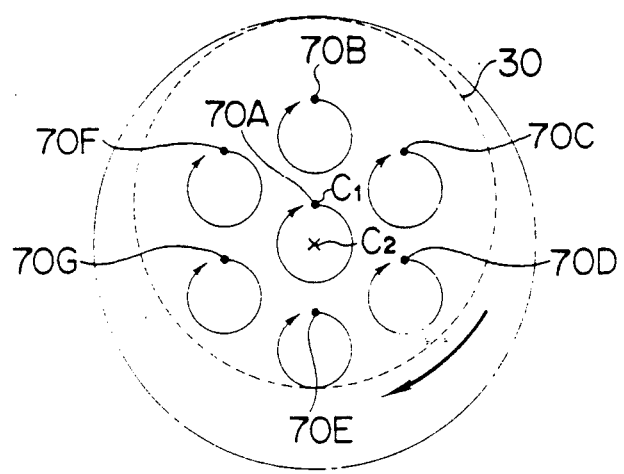
FIG. 6 shows trajectories of the nozzles in the condition where the nozzle head is not moved transversely but is held stationary.

With the device as mentioned above, when pressurized water W is fed from the pump to the flexible shaft 32, the water W is passed through the liquid feed pipe 20 to be ejected from each of the nozzles, described later, toward the object surface. At this moment, the air motor 42 is rotated, and the driven gear 16 is rotated through the function of the driving gear 50. The driven gear 16 has the liquid feed pipe 20 at an eccentric position deviated from the axis $C_1$ of the holder 10. Therefore, as shown in FIG. 6, the nozzle head 30 is caused to revolve round the axis C, while rotating on its own axis, preferably at 800 to 4000 rpm. Following up to the revolution round the axis $C_1$, a front portion of the flexible shaft 32 is rotated while being deflected. The swing is absorbed by the bearings 22, 24.

Figure 3:
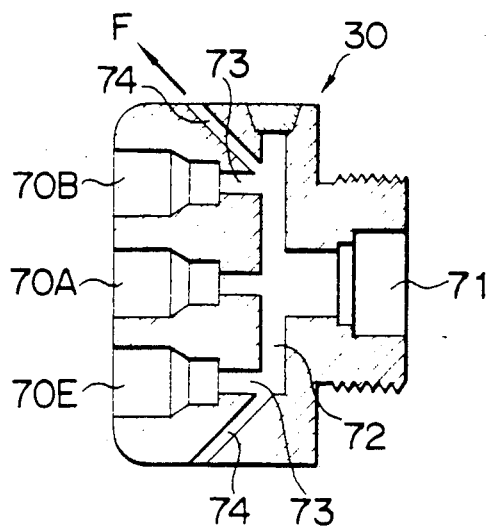
FIG. 3 is a sectional view of a nozzle head of the pressurized water jetting device.
Figure 4:
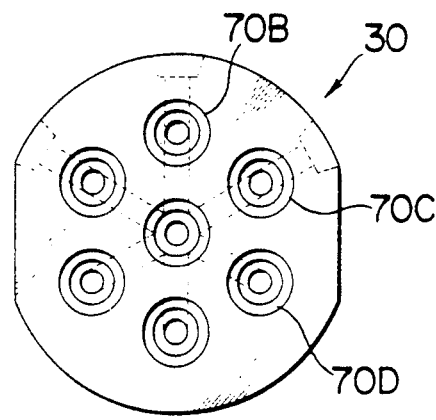
FIG. 4 is a left side view of the nozzle head.

In the above example, the nozzle head 30 is provided with a plurality of nozzles 70A, 70B . . . , for instance, seven nozzles, as shown in FIGS. 3 and 4. In the example shown in the figures, one nozzle is provided at the center, and six nozzles are arranged around the central nozzle at an angular pitch of 60°. The nozzle head 30 is provided in the center thereof with an inlet hole 71 communicating with the liquid feed pipe 20. From an intermediate portion of the inlet hole 71, connecting holes 72 are extended radially, which communicate with the nozzles 70A, 70B . . . through respective introduction holes 73. The number of the nozzles may be more than 7.

Figure 5:
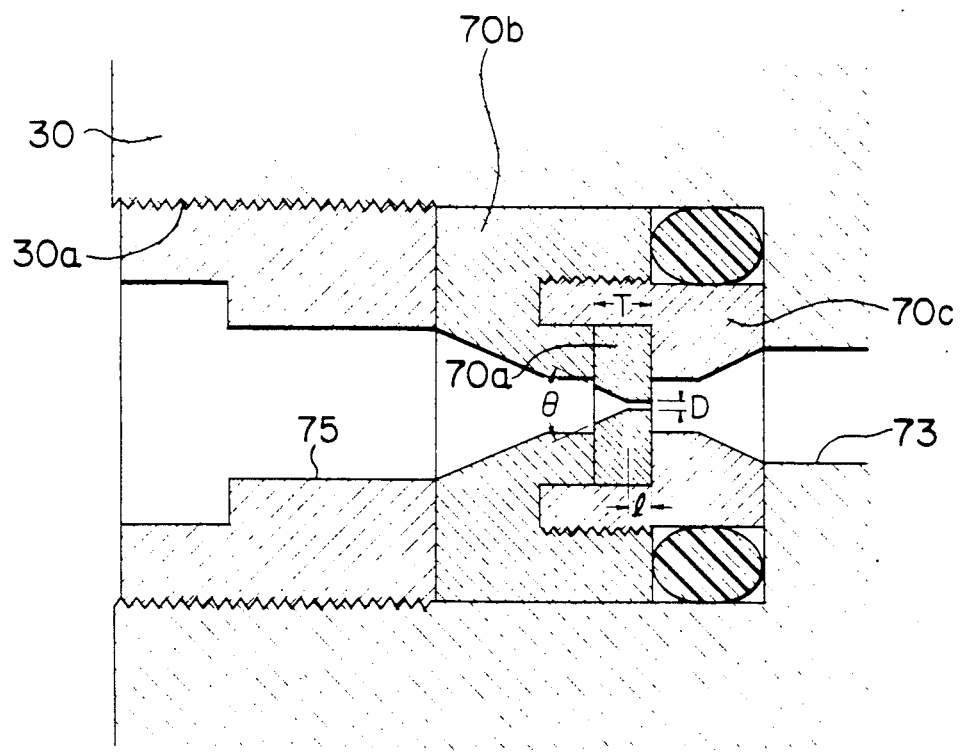
FIG. 5 is a detailed sectional view of a nozzle.

Details of each nozzle are shown in FIG. 5. A nozzle chip 70a formed of diamond, for instance, is inserted in an insertion hole 30a in the state of being clamped by retainer pieces 70b, 70c, and is held in position by a nut 75 provided with a hexagonal hole.

The diameter D of the nozzle chip 70a is set to a small value, for instance, 0.15 mm, and the tip thereof is gradually enlarged at a diverging taper angle $\theta$ of 25° to 55°, preferably 35° to 45°.

In removing the sprayed asbestos by use of the gun G mentioned above, the pressure of pressurized water fed to each of the nozzles 70A, 70B, . . . is preferably at least 800 kg/cm², more preferably at least 1000 kg/cm².

Figure 7:
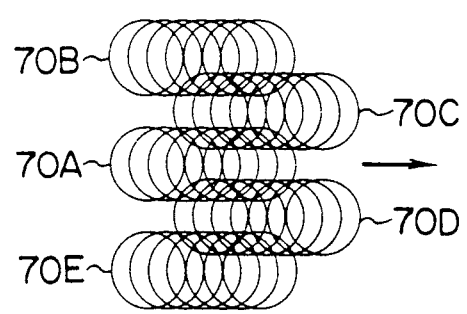
FIG. 7 shows trajectories of major nozzles in the doncition where the nozzle head is moved transversely.

When the pressurized water is jetted from each nozzle while the nozzle 30 is revolved round the axis $C_1$ as shown in FIG. 6 under these conditions, the trajectories of the nozzles are as shown in FIG. 6. When the nozzle head 30 is moved transversely, the trajectories are as shown in FIG. 7 (the trajectories of the nozzles 70F, 70G are not shown). Therefore, the pressurized water acts on the entire part of the object surface, and removal of the sprayed asbestos is conducted for the entire part of the object surface.

On the other hand, a construction may be adopted wherein the nozzle head 30 is provided with one or a plurality of curtain nozzles 74 in the angle range of, for instance, 15° to 65° from the center axis of the nozzle head 30, and the pressurized water is jetted in a mist form also from the curtain nozzles 74 while the to nozzle head 30 is rotated. In that case, it is possible to form a substantially conical curtain of mist around the object surface under separation, or stripping, on the front side of the nozzle head 30. The presence of the curtain of mist prevents the asbestos fibers from flying off outward from the object surface. Even if the asbestos fibers fly out of the curtain, the asbestos fibers are wetted in the curtain, resulting in a greater effect on the prevention of re-floating of the asbestos fibers fallen to the floor.

EXAMPLES

The effects of this invention will now be eludicated by the following examples.

EXAMPLE 1

Removal of sprayed asbestos with which the ceiling of a building in a plant was covered was carried out for a ceiling area of 300 m². The gun as shown in FIG. 2 was used, and the removal operation was carried out under the following conditions.

Nozzle: Nozzle diameter = 0.1 mm Number of nozzles = 15
Pressure of pressurized water = 1500 kg/cm²·G
Total water quantity = 5 l/min
Rotating speed of nozzle head = 1500 rpm.

The operation was performed by the two workers wearing dustproof clothing, dust respirators, goggles, foot covers and gloves, in a workroom formed by laying a polyvinyl chloride sheet, 0.15 mm thick, on the floor and the walls. One of the two workers served as an assistant for floor cleaning or the like.

The working efficiency was as high as 20 to 30 min per 10 m², and satisfactory removal of the sprayed asbestos was accomplished even for the ceiling portions behind electric wiring.

The asbestos dust concentration in the workroom was increased during the operation to 6 times the initial value. After 15 min, however, the dust concentration was lowered to a value substantially equal to the initial value, that is, the interior of the wookroom became clean. It is considered that the large amount of mist, which was generated during the operation, fell to the floor together with the asbestos dust.

The collectability of asbestos in the case of scattering a polymeric water absorbent (AQUAKEEP 10SH, a product by Seitetsu Kagaku Co., Ltd.) over the floor prior to the stripping operation was higher than that in the case of not scattering the polymeric water absorbent. The asbestos thus collected was mixed with Portland cement and sand, and the resultant mixture was buried deep underground after solidification.

COMPARATIVE EXAMPLE 1

Removal of the sprayed asbestos by rod-type scrapers was carried out for a 50 m² portion of a 300 m² ceiling area. The working efficiency was as low as 150 min per 10 m², and a little asbestos was left on the ceiling substrate.

The asbestos dust concentration was increased during the operation to 23 times the initial value. Even after 1 hour, the dust concentration was as high as 9 times the initial value. In addition, floating of dust of the asbestos fallen to the floor was visually confirmed as the worker walked. Collection of asbestos was achievable by use of shovels or scoops for part of the fallen asbestos, but the collection of the residual part (one fifth of the total amount of the fallen asbestos) required the use of a dust collector.

As has been described hereinabove, according to this invention, it is possible to separate, or strip, an asbestos-containing material from a substrate surface extremely easily and highly efficiency, with little flying-off, dusting or floating of asbestos fibers.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A process for separation of an asbestos-containing material from a surface to which the asbestos-containing material is adhered while preventing release into the atmosphere of the separated asbestos-containing material as a fine dust, utilizing an elongated holder having a central longitudinal axis, a front axial end and a rear axial end, a nozzle head mounted on said front axial end of said holder and extending frontwardly therefrom, said nozzle head having a central axis that is parallel with and laterally offset from said central longitudinal axis of said holder, means for continuously revolving said nozzle head about said central longitudinal axis of said holder, said nozzle head having a plurality of space-apart nozzles arranged in a pattern on the front face thereof so that said nozzles move through separate circular paths when said nozzle head revolves around said central longitudinal axis of said holder, said nozzles having an orifice diameter of from 0.05 to 0.5 mm, which comprises the steps of:

continuously and unidirectionally revolving said nozzle head around said central longitudinal axis of said holder at a rate of 800 to 4000 rpm;
simultaneously moving said nozzle head substantially in parallel with said surface;
simultaneously supplying water at a pressure of 80 kg/cm² or higher at a volumetric flow rate not greater than 12 liters/min to said nozzles for thereby jetting said high pressure water from said nozzles against said surface, the loci of the streams of said high pressure water jetted from said nozzles overlapping each other as said revolving nozzle head is moved substantially in parallel with said surface; and
disposing a polymeric water absorbent material on a floor surface facing said surface from which said asbestos-containing material is separated.

2. The process according to claim 1, wherein:

said pressure of jetted pressurized water is in the range 80 kg/cm² to 1000 kg/cm².

3. The process according to claim 2, wherein:

said holder is mounted to a mobile stripping machine to support and move said revolving head securely to a maximum jetting pressure of 1000 kg/cm² during operation.

4. The process according to claim 3, wherein:

said holder disposes the nozzle head at a distance between 3 and 50 cm from the surface holding the asbestos-containing material.

5. The process according to claim 1, comprising the further step of:

rotating said nozzle head about a nozzle axis as said nozzle head is revolved around the central longitudinal axis of the holder.

6. The process according to claim 1, comprising the further step of:

prior to the other steps, applying a sheet of retaining material to enclose a space containing the surface from which the asbestos-containing material is to be separated.

7. The process according to claim 1, comprising the further step of:

pretreating the asbestos-containing material by first spraying an initial quantity of water thereto, and allowing 4-5 seconds to elapse before applying said pressurized water flow from said revolving nozzle head.

8. The process according to claim 1, comprising the further step of:

combining the polymeric water absorbent material and the separated asbestos-containing material with a cementitious material for solidification and burial thereof.

9. The process according to claim 1, wherein:

the pressurized water is jetted substantially in a mist form to the asbestos-containing material adhered to said surface, thereby causing said asbestos-containing material to be wetted so as to cause the same to adhere to said jetted water of the mist and fall to the floor surface therewith.

10. A process for separation of an asbestos-containing material from a surface to which the asbestos-containing material is adhered while preventing release into the atmosphere of the asbestos-containing material as a fine dust, comprising the steps of:

disposing a polymeric water absorbent material on a floor surface facing the surface to which the asbestos-containing material is adhered;

jetting pressurized water from a plurality of nozzles to an exposed surface of said asbestos-containing material at a pressure of at least 80 kg/cm², to thereby wet and separate from the surface the asbestos-containing material by application thereto of energy possessed by the jetted flow of pressurized water; and collecting and disposing of said separated wet asbestos-containing material and any of said jetted water that has fallen to the floor surface together with the polymeric water absorbent.

11. The process according to claim 10, comprising the further step of:

combining the polymeric water absorbent material and the separated asbestos-containing material with a cementitious material for solidification and burial thereof.

12. The process according to claim 10, wherein:

said polymeric water absorbent material is adhered to a base sheet spread over said floor surface.

13. The process according to claim 12, wherein:

said polymeric water absorbent material is distributed at a rate of 30 g/m²-1000 g/m² of the floor surface.

* * * * *